United States Patent
Agarwal et al.

(10) Patent No.: US 11,485,836 B2
(45) Date of Patent: Nov. 1, 2022

(54) COMPOSITIONS AND METHODS FOR IMPROVED ABRASION RESISTANCE OF POLYMERIC COMPONENTS

(71) Applicant: Albany International Corp., Rochester, NH (US)

(72) Inventors: Dhruv Agarwal, Cortland, NY (US); Louis Jay Jandris, Lafayette, NY (US)

(73) Assignee: Albany International Corp., Rochester, NH (US)

( * ) Notice: Subject to any disclaimer, the term of this patent is extended or adjusted under 35 U.S.C. 154(b) by 0 days.

(21) Appl. No.: 16/990,535

(22) Filed: Aug. 11, 2020

(65) Prior Publication Data

US 2021/0024724 A1 Jan. 28, 2021

Related U.S. Application Data

(62) Division of application No. 15/157,780, filed on May 18, 2016, now Pat. No. 10,759,923.

(Continued)

(51) Int. Cl.
| | |
|---|---|
| C08K 7/20 | (2006.01) |
| D01F 1/10 | (2006.01) |
| C08J 3/22 | (2006.01) |
| C08L 67/02 | (2006.01) |
| D01F 6/84 | (2006.01) |
| D04H 13/00 | (2006.01) |
| D21F 1/00 | (2006.01) |

(Continued)

(52) U.S. Cl.
CPC .................. *C08K 7/20* (2013.01); *C08J 3/22* (2013.01); *C08L 67/02* (2013.01); *D01F 1/10* (2013.01); *D01F 6/84* (2013.01); *D04H 13/00* (2013.01); *C08J 2367/02* (2013.01); *C08K 2201/003* (2013.01); *D01F 6/58* (2013.01); *D01F 6/88* (2013.01); *D21F 1/0027* (2013.01); *D21F 7/08* (2013.01)

(58) Field of Classification Search
CPC ......................................................... C08K 7/20
See application file for complete search history.

(56) References Cited

U.S. PATENT DOCUMENTS

| | | | |
|---|---|---|---|
| 3,230,184 | A | 1/1966 | Alford |
| 3,486,266 | A | 12/1969 | Richardson et al. |

(Continued)

FOREIGN PATENT DOCUMENTS

| | | | |
|---|---|---|---|
| CN | 101704632 A | 5/2010 | |
| CN | 102753745 A | 10/2012 | |

(Continued)

OTHER PUBLICATIONS

International Search Report and Written Opinion issued by the European Patent Office as the ISA for International ApplicationPCT/US2016/033022 dated Sep. 9, 2016.

(Continued)

*Primary Examiner* — Arrie L Reuther
(74) *Attorney, Agent, or Firm* — McCarter & English, LLP

(57) ABSTRACT

Described herein are component compositions comprising a blend of a polymer resin together with silica glass beads. In certain embodiments, the components demonstrate improved abrasion resistance as do the industrial fabrics produced that comprise at least one component of the instant disclosure.

15 Claims, 16 Drawing Sheets

Related U.S. Application Data

(60) Provisional application No. 62/237,300, filed on Oct. 5, 2015.

(51) Int. Cl.
*D01F 6/88* (2006.01)
*D01F 6/58* (2006.01)
*D21F 7/08* (2006.01)

(56) References Cited

U.S. PATENT DOCUMENTS

| | | | |
|---|---|---|---|
| 4,427,734 A | 1/1984 | Johnson | |
| 4,457,968 A | 7/1984 | Harvey | |
| 4,567,077 A | 1/1986 | Gauthier | |
| 4,759,976 A | 7/1988 | Dutt | |
| 4,861,515 A | 8/1989 | Minamisawa et al. | |
| 5,132,356 A | 7/1992 | Siddiqui | |
| 5,137,939 A | 8/1992 | Siddiqui | |
| 5,207,959 A | 5/1993 | Antikow et al. | |
| 5,278,205 A | 1/1994 | Siddiqui | |
| 5,278,221 A | 1/1994 | Siddiqui | |
| 5,283,110 A | 2/1994 | Gardner et al. | |
| 5,297,590 A | 3/1994 | Fleischer | |
| 5,378,537 A | 1/1995 | Masuda et al. | |
| 5,407,736 A | 4/1995 | McKeon | |
| 5,460,869 A | 10/1995 | McKeon | |
| 5,472,780 A | 12/1995 | Baris et al. | |
| 5,489,467 A | 2/1996 | McKeon et al. | |
| 5,514,472 A | 5/1996 | Baris et al. | |
| 5,759,685 A | 6/1998 | Baris et al. | |
| 5,804,659 A | 9/1998 | Reither | |
| 5,922,463 A | 7/1999 | Baris et al. | |
| 6,048,481 A | 4/2000 | Heffner et al. | |
| 6,077,609 A | 6/2000 | Blong et al. | |
| 6,136,437 A | 10/2000 | Reither | |
| 6,207,275 B1 | 3/2001 | Heffner et al. | |
| 6,323,271 B1 | 11/2001 | Caldwell et al. | |
| 6,544,644 B1 | 4/2003 | Bouquerel et al. | |
| 6,630,223 B2 | 10/2003 | Hansen | |
| 6,838,173 B2 | 1/2005 | Naruse et al. | |
| 6,918,998 B2 | 7/2005 | Hansen | |
| 7,005,044 B2 | 2/2006 | Kramer et al. | |
| 7,306,703 B2 | 12/2007 | Hawes | |
| 8,383,716 B2 * | 2/2013 | Chi | C08K 5/5455 524/493 |
| 8,388,812 B2 | 3/2013 | Eagles et al. | |
| 8,394,239 B2 | 3/2013 | Eagles et al. | |
| 8,691,906 B2 | 4/2014 | Volkel et al. | |
| 8,721,943 B2 | 5/2014 | Moore et al. | |
| 8,728,280 B2 | 5/2014 | Eagles et al. | |
| 8,758,569 B2 | 6/2014 | Aberg et al. | |
| 8,764,943 B2 | 7/2014 | Eagles et al. | |
| 8,883,917 B1 | 11/2014 | Davies et al. | |
| 9,416,485 B2 | 8/2016 | Moore et al. | |
| 9,453,303 B2 | 9/2016 | Aberg et al. | |
| 2006/0058441 A1 | 3/2006 | Delker et al. | |
| 2007/0026228 A1 | 2/2007 | Hartmann et al. | |
| 2007/0232170 A1 | 10/2007 | Atwood et al. | |
| 2009/0169882 A1 * | 7/2009 | Jandris | C08L 67/00 428/373 |
| 2009/0192257 A1 | 7/2009 | Hayata et al. | |
| 2010/0035045 A1 | 2/2010 | McAmish | |
| 2010/0068516 A1 | 3/2010 | Yoon et al. | |
| 2010/0203328 A1 | 8/2010 | Hochstetter et al. | |
| 2012/0088046 A1 * | 4/2012 | Nakamura | B29C 70/64 428/34.5 |
| 2012/0129990 A1 * | 5/2012 | Kikuchi | C08L 69/00 524/143 |
| 2012/0214374 A1 | 8/2012 | Mahesha et al. | |
| 2014/0127959 A1 | 5/2014 | Usuki | |
| 2015/0137362 A1 | 5/2015 | Lau et al. | |
| 2015/0336338 A1 | 11/2015 | Bordere et al. | |

FOREIGN PATENT DOCUMENTS

| | | |
|---|---|---|
| CN | 103044853 A | 4/2013 |
| CN | 103709669 A | 4/2014 |
| CN | 103865202 A | 6/2014 |
| CN | 103923380 A | 7/2014 |
| CN | 104379639 A | 2/2015 |
| CN | 104725839 A | 6/2015 |
| EP | 0 491 504 A2 | 6/1992 |
| EP | 0 648 802 A | 4/1995 |
| EP | 2 907 959 A1 | 8/2015 |
| FR | 2918081 A1 | 1/2009 |
| GB | 954024 | 4/1964 |
| JP | 60-76561 A | 5/1985 |
| JP | 04-323229 A | 11/1992 |
| JP | 09-040836 A | 2/1997 |
| JP | 2002-235012 A | 8/2002 |
| JP | 2004-308091 A | 11/2004 |
| JP | 2009-130999 A | 6/2009 |
| KR | 10-1355801 B1 | 1/2014 |
| RU | 2008112217 A | 10/2009 |
| RU | 2486216 C2 | 6/2013 |
| WO | WO 97/14846 A1 | 4/1997 |
| WO | WO 99/05358 A1 | 2/1999 |
| WO | WO 02/462882 A2 | 6/2002 |
| WO | WO 2012/140993 A1 | 10/2012 |

OTHER PUBLICATIONS

Search Report prepared by the Federal Service for Intellectual Property (Rospatent) for corresponding Russian patent application 2017146256 dated Oct. 8, 2018.
Matinlinna, Jukka Pekka: "Glass Fibers in Fiber-Reinforced Composites", *Handbook of Oral Biomaterials*, Jul. 2014, CRC Press Taylor & Francis Group, p. 264.
Zhang, Meiyun et al.: *Papermaking Technology*, 1$^{st}$ Edition, China Light Industry Press, Jan. 2014, cover pages, preface, index and p. 260, in Chinese with English summary and translation of preface.
Ding, Hao et al.: *Practical Handbook of Plastics Industry*, Second Edition, vol. 1, Chemical Industry Press, Aug. 2000, cover pages, index and p. 463, in Chinese with English summary.
Chen, Jiawei et al.: *Concise Chemistry Dictionary*, 1$^{st}$ Edition, Hubei Lexicographic Publishing House, Jul. 1987, cover pages, index and p. 283, in Chinese with English summary.
Compiled by Chemical Industry Press: *Encyclopedia of Chinese Chemical Products*, Third Edition, vol. 1, Chemical Industry Press, Jan. 2005, cover pages, index and p. 1298 in Chinese with English summary.

* cited by examiner

Fig. 2
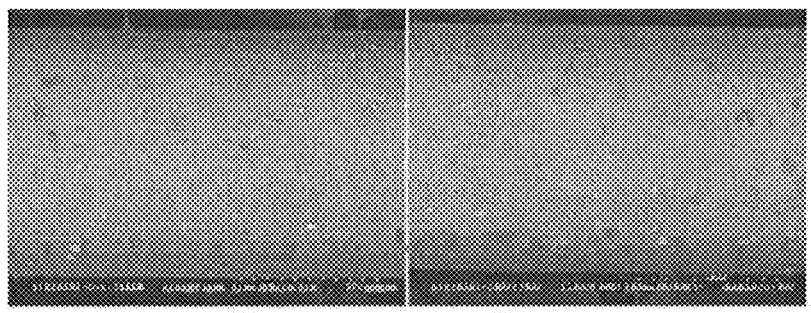
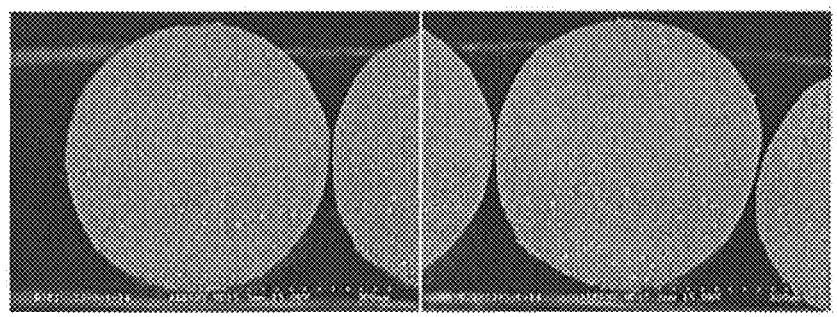

HYDROLYSIS RESISTANCE @ 15 psi STEAM

COF Of Monofilaments Comparison Percent Difference From a PET Standard

Fig. 9
STATIC CONTACT ANGLE OF SAME DIAMETER MONOFILAMENT FILM SAMPLES
Improved Hydrophobicity measured as Static Contact Angle:
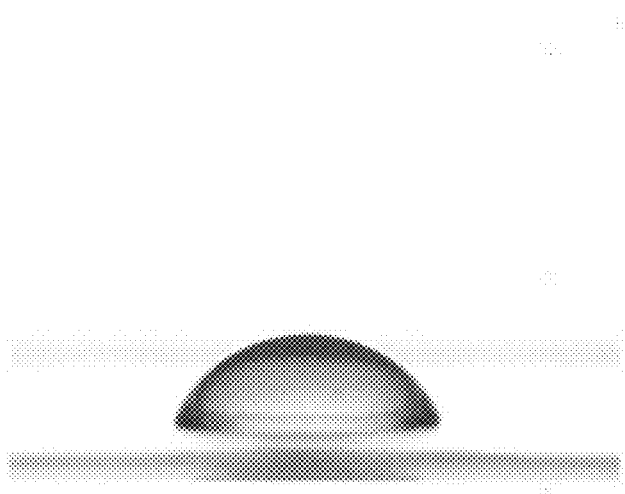
100% PET – 61-63 Deg
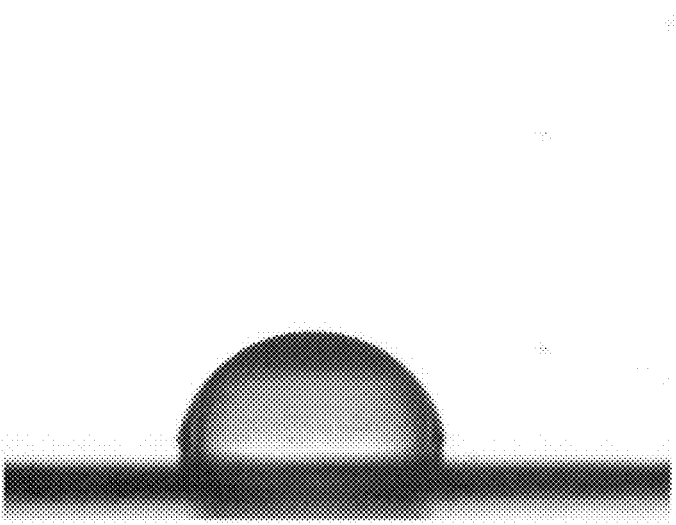
10% PBTXXX062813C1 – 74.7 Degree Contact Angle

FABRIC ABRASION TEST

FABRIC ABRASION TEST

FABRIC ABRASION TEST

FABRIC ABRASION TEST

COMPOSITIONS AND METHODS FOR IMPROVED ABRASION RESISTANCE OF POLYMERIC COMPONENTS

CROSS-REFERENCE TO RELATED APPLICATIONS

This application is a division of U.S. patent application Ser. No. 15/157,780 filed May 18, 2016, which claims the benefit of priority of U.S. Provisional Application Ser. No. 62/237,300 filed Oct. 5, 2015. The foregoing applications are incorporated by reference herein in their entireties.

FIELD OF THE DISCLOSURE

This application and the disclosures described herein generally discuss and relate to polymeric compositions comprising silica particles. More particularly, the invention relates to a polymer resin composition used in the manufacture of components for use in industrial fabrics and belts made from mixing a polymer resin with a silica particle additive to improve the abrasion resistance of the industrial fabric or belt comprising the component.

BACKGROUND OF THE DISCLOSURE

An industrial fabric or belt is an endless structure in the form of a continuous loop such as a forming fabric, press fabric, dryer fabric or process belt (e.g., shoe press belt, transfer belt, calendar belt), reel belt, a structure used as an impression fabric, through air dryer ("TAD") fabric used in the production of tissue and towel (together known as "paper machine clothing" or "PMC"). Other industrial fabrics include: corrugator belts for producing corrugated boxboard, fabrics and belts and sleeves used in the production of nonwovens by processes such as melt-blowing, spun bond, hydroentangling, or air laid; a fabric used in a sludge filter or other wet filtration processes; or a fabric used in textile finishing processes such as sanforizing; belts used in hide tanning; and other conveyor belts such as those used in food processing.

While the discussion here is for the papermaking process in general, the application of the present disclosure is not considered limited thereto.

During the papermaking process, a cellulosic fibrous web is formed by depositing a fibrous slurry, that is, an aqueous dispersion of cellulose fibers, onto a moving forming fabric in a forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the remaining water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

In the production of tissue or towel, forming and press fabrics provide the same function as in paper making above. There may also be other fabrics such as impression fabrics or TAD fabrics, as well as reel belts.

Base fabrics, which form an important portion of the above discussed fabrics, take many different forms. For example, they may be woven either endlessly or flat woven and subsequently rendered into endless form with a woven seam using one or more layers of machine direction ("MD") and cross-machine direction ("CD") yarns. Further, the woven base fabrics may be laminated by placing one base fabric within the endless loop formed by another, and joining or laminating together by various means known to those skilled in the art such as by needling a staple fiber batt through both base fabrics to join them to one another.

Different polymeric materials may be used in the formation of MD/CD yarns and if present, the batt fibers that form these fabrics. One example of a polymeric resin that may be used for this purpose is polyester. Because these fabrics are exposed to harsh environments, it is essential that the material used to form these yarns and fibers exhibit good abrasion-resistant properties. While pure (100%) material used for a yarn or fiber, for example, polyester as a forming fabric yarn, has excellent required yarn modulus, it has relatively poor abrasion resistance. While attempts to improve these shortcomings have been made, none have shown the required level of improvement.

Other structural components such as foils or films, can be used as a layer in a structure for the uses aforementioned. Such films comprise polymers such as, but not limited to, polyester or polyurethane.

Lastly, coatings such as used to manufacture shoe press belts, calendar belts, transfer belts, certain tissue/towel impression fabrics, and several of the engineered fabrics also have this requirement of anti-contamination or easier removal of contaminants. The coatings may comprise polyurethane or other polymers.

Products comprising various amounts of inorganic compounds and/or mineral fillers have been known. For example, U.S. Pat. No. 6,323,271 pertains to a polyester resin containing silica beads used in beverage containers to reduce the surface coefficient of friction. U.S. Pat. Nos. 5,278,221, 5,278,205, 5,137,939, and 5,132,356 likewise pertain to films of polyester containing glass spheres to reduce the dynamic coefficient of friction of the film and the addition of fumed silica to improve the static coefficient of friction of the film. U.S. Pat. No. 3,230,184 relates to a PET resin for molding with a fibrous material and hollow discrete spheres of silicate-based glass. Further, European Pat. No. EP648,802 relates to polyester film with polyester polymer containing precipitated silica particles and calcined clay. British Pat. No. GB954024A discloses the production of improved polyester filaments with some form of silica particles less than 20 microns in diameter. U.S. Pat. No.

3,486,266 appears to disclose a sheath core material with plasticized polyvinyl chloride having microscopic glass beads dispersed therein. U.S. Pat. No. 5,207,959 discloses fumed silica with a particle size of between 5 and 15 nm mixed into a molten polymer. Further, U.S. Pat. No. 5,132,356 relates to a polyester film containing small glass spheres and fumed silica. In that disclosure, the polyester film contains glass spheres having an average particle size of 2-3 microns and a particle distribution of 99.9% below about 8 microns. U.S. Pat. No. 6,544,644 is directed toward abrasion resistant spun articles and discloses threads, fibers, or filaments containing 0.05-20 wt % nanoparticles dispersed in the resin. U.S. Pat. No. 6,838,173 pertains to a polyester fiber and production method of polyester composition. In that disclosure, the polyester fiber comprises silica-based inorganic particles (1-20 wt %) with an average particle diameter of 0.01-10 microns. U.S. Pat. No. 8,691,906 discloses a method for producing monofilament fibers comprising an aliphatic-aromatic polyester, a hydrolysis stabilizer, and spherical particles of oxides of silicon, of aluminum, and/or of titanium having an average particle diameter of not more than 100 nm. U.S. Pat. No. 8,383,716 relates to polyester nanocomposites made of polyester and silica nanoparticles therein, where the surface of the nanoparticles is modified by 3-[(propyleneoxycarbonylamido) propyl]-trialkyloxysilane. Finally, U.S. Pat. No. 8,883,917 discloses nylon polymers having a low coefficient of friction and method for preparation of a polyamide-based composition comprising particulate silica substantially uniformly dispersed into a polyamide matrix.

When a fabric structure is used as paper machine clothing, the components (for example, monofilaments in a woven structure) are generally exposed to harmful, abrasive environments that cause wear and tear to the fabrics. A component demonstrating abrasion resistant properties is therefore needed.

SUMMARY OF THE DISCLOSURE

An object of this disclosure is to create a polymeric composition used to form a component for use in an industrial fabric with improved abrasion-resistant properties.

The present disclosure is directed to compositions comprising at least one polymeric resin and at least one silica particle. The compositions may be extruded or spun into fibers, yarns, films, foils, nettings, meshes, structured deposits, and other extruded or spun elements like rings and spiral coils. The compositions may be used as wear surfaces of industrial fabrics such as paper machine clothing (PMC) or engineered fabrics, including use as binder yarns in multi-layer woven fabrics. It has been found that the addition of certain micron-sized silica particles to a polymer melt during the extrusion or spinning process yields a component with improved abrasion resistance.

"Components" include fibers, filament yarns, films, foils, tapes, netting (mesh), rings, spiral link coils or other extruded or spun elements, a structured deposit in a desired pattern, or a coating (either the deposit or coating can be continuous on a surface, or discontinuous in a desired pattern (for example rectangles), or side by side continuous or discontinuous MD or CD strips wherein the edges of the adjacent strips are not in contact with each other, e.g., there is a "space" in between adjacent strips). The strips can also be at an angle to the MD, and can be curved, zigzagged or sinusoidal in shape. In certain embodiments, an advantage of the present disclosure is to improve the abrasion-resistant properties of the component.

It is an object of the present disclosure to provide a component composition comprising at least one polymer resin and at least one silica particle, which is suitable for the production of fibers, filaments, films, foils, tapes, netting, meshes, rings or other extruded or spun elements, a structured deposit in a desired pattern, or a coating exhibiting improved abrasion resistance-compared to components of pure 100% polymer resin or other combinations of resin and additives.

It is another object of the present disclosure to provide an industrial fabric or belt with improved abrasion-resistant properties where that fabric or belt is produced using a component comprising at least one polyester resin, such as for example: polyethylene terephthalate (PET), polyethylene naphthalate (PEN), polybutylene terephthalate (PBT), polybutylene naphthalate (PBN), polytrimethylene naphthalate (PTN), poly(cyclohexylene dimethylene terephthalate) acid (PCTA), copolymers or blends of polyester; or a polyamide, such as, for example PA 6; PA 6,6; PA 6,12; PA 6,10; PA 4,6; PA 10; PA 11; PA 12; or MXD6; or, aromatic polyamides (polyaramids); or, copolymers or blends of polyamides; or, polyphenyl sulfide (PPS) or blends thereof; or, polyether ether ketone (PEEK) or blends thereof; or, polyether ketone (PEK) or blends thereof; or polyurethane or blends thereof. "Blends thereof" as used herein means that the resin named can be blended with another resin, for example, such as a polyester can be blended with a urethane, or two polyesters or two polyamides can be blended together.

The polymer composition according to the present disclosure is suitable for the production of components such as fibers and filament yarns. More specifically, the polymer resin composition is suitable for manufacturing of yarns, fibers, films, foils, tapes, netting, meshes, rings or other extruded or spun elements, a structured deposit in a desired pattern, or a coating made from a blend of at least one polymer resin, at least one type of silica particles, and optionally other additives that can be used in industrial fabrics, and a method of manufacturing the same.

In certain embodiments, a composition suitable for the production of the aforementioned components exhibiting the above discussed properties is obtained by blending and extruding at least one type of silica particles with at least one polymer resin.

As described herein, the invention relates to a resin component composition comprising at least one polymer resin and at least one type of silica glass bead. In certain embodiments, the silica glass bead comprises a metal oxide. In further embodiments, the silica glass bead is selected from A-glass and E-glass beads. In some embodiments, the composition comprises about 1% to about 4% by weight silica glass beads. In some embodiments, the silica glass beads are between 0.01-10 microns in average particle size diameter. In certain embodiments, the silica glass beads are between 0.1-10 microns in average particle size diameter. In other embodiments, the silica glass beads are between 1-10 microns in average particle size diameter.

In some embodiments, the composition comprises about 4% to about 98% by weight of a polymer resin. In certain embodiments, the composition further comprises about 1% to about 4% by weight silica glass beads. In further embodiments, the composition comprises about 0.5% to about 5% by weight of a siloxane content additive. In a particular embodiment, the siloxane content additive comprises polydimethylsiloxane (PDMS). In certain embodiments, about 1% to about 5% of said composition by weight comprises a siloxane content additive. In some embodiments, the silica glass beads are substantially round or spherical. In some embodiments, the silica glass beads are between 0.01-10 microns in average particle size diameter. In certain embodiments, the silica glass beads are between 0.1-10 microns in average particle size diameter. In other embodiments, the silica glass beads are between 1-10 microns in average particle size diameter.

In some embodiments, the polymer resin of the composition comprises at least one polymer selected from the group consisting of: polyethylene naphthalate (PEN), polyethylene terephthalate (PET), polybutylene naphthalate (PBN), polytrimethylene naphthalate (PTN), poly(cyclohexylene dimethylene terephthalate) acid (PCTA), polybutylene terephthalate (PBT), polyamide (PA 6; PA 6,6; PA 6,12; PA 6,10; PA 4,6; PA 10; PA 11; PA 12; MXD6, and aromatic derivatives thereof), polyether ether ketone (PEEK), polyether ketone (PEK) and poly(p-phenylene sulfide) (PPS/RYTON®), polyurethane, polysiloxane, and copolymers thereof. In certain embodiments, the polymer resin comprises at least one polyester selected from the group consisting of: polyethylene naphthalate (PEN), polyethylene terephthalate (PET), polybutylene naphthalate (PBN), polytrimethylene naphthalate (PTN), poly(cyclohexylene dimethylene terephthalate) acid (PCTA), and polybutylene terephthalate (PBT).

In some embodiments, the composition comprises at least two polymer resins. In further embodiments, the composition comprises two or more polymers selected from the group consisting of polyethylene naphthalate (PEN), polyethylene terephthalate (PET), polybutylene naphthalate (PBN), polytrimethylene naphthalate (PTN), poly(cyclohexylene dimethylene terephthalate) acid (PCTA), polybutylene terephthalate (PBT), polyamide (PA 6; PA 6,6; PA 6,12; PA 6,10; PA 4,6; PA 10; PA 11; PA 12; MXD6, and aromatic derivatives thereof), polyether ether ketone (PEEK), polyether ketone (PEK) and poly(p-phenylene sulfide) (PPS/RYTON®), polyurethane, polysiloxane, and copolymers thereof.

In some embodiments, the polymer resin of the composition comprises PET.

In certain embodiments, the composition comprises A-glass beads. In other embodiments, the composition comprises E-glass beads. In yet other embodiments, the composition comprises both A-glass and E-glass beads. In certain embodiments, the composition further comprises the siloxane content additive PDMS.

In some embodiments, the composition comprises about 4% to about 98% by weight of a polymer resin. In certain embodiments, the composition comprises one polymer resin in an amount of about 20% to about 98% of said composition by weight. In certain embodiments, the composition comprises at least two polymer resins. In further embodiments, about 20% to about 98% of the composition by weight comprises two or more polymer resins.

In some embodiments, the composition comprises about 4% to about 98% by weight of a polymer resin and about 1% to about 4% by weight silica glass beads. In certain embodiments, about 20% to about 98% of the composition by weight comprises a polymer resin. In further embodiments, about 20% to about 98% of the composition by weight comprises two or more polymer resins.

In some embodiments, the composition comprises about 4% to about 98% by weight of a polymer resin and about 1% to about 4% by weight silica glass beads, wherein the at least one polymer resin is PET and the silica glass beads are A-glass beads. In other embodiments, the at least one polymer resin is PET and the silica glass beads are E-glass beads. In yet other embodiments, the at least one polymer resin is PET and the silica glass beads are both A-glass and E-glass beads.

In a particular embodiment, the composition comprises (a) 89% by weight PET; (b) 6% by weight PBT; (c) 2% by weight of a siloxane additive; (d) 1% by weight carbodiimide; and (e) 2% by weight silica glass beads.

In some embodiments, the composition of the invention comprises one or more additives selected from the group consisting of: stabilizers, compatibilizers, hydrolysis or oxidation-resistant additives, dyes, and pigments.

The invention further relates to a monofilament yarn comprising a resin component composition comprising at least one polymer resin and at least one type of silica glass bead, wherein about 4% to about 98% of the composition by weight comprises a polymer resin and about 1% to about 4% of the composition by weight comprises silica glass beads, optionally wherein the resin component composition comprises about 0.5% to about 5% by weight of a siloxane content additive. In certain embodiments, the water contact angle on the monofilament yarn surface is greater than 74 degrees. In some embodiments, the monofilament yarn has a round or non-round cross-section. In certain embodiments, the abrasion resistance of the monofilament yarn is improved at least 5% compared to said monofilament yarn made without silica glass beads. In some embodiments, the abrasion resistance of the monofilament yarn is improved at least 10% compared to said monofilament yarn made without silica glass beads. In other embodiments, the abrasion resistance of the monofilament yarn is improved at least 15% compared to said monofilament yarn made without silica glass beads. In yet other embodiments, the abrasion resistance of the monofilament yarn is improved at least 20% compared to pure polymer resin monofilament yarn.

In some embodiments, the instant invention relates to a method of manufacturing a resin component composition comprising a polymer resin, silica glass beads, wherein said silica glass beads are added simultaneously to said polymer resin, which is then extruded or spun. In other embodiments, the resin component composition manufacturing method further comprises a siloxane additive, wherein a siloxane additive and the silica glass beads are added simultaneously to the polymer resin, which is then extruded or spun.

In some embodiments, the method of manufacturing the composition comprises one or more polymers selected from the group consisting of: polyethylene naphthalate (PEN), polyethylene terephthalate (PET), polybutylene naphthalate (PBN), polytrimethylene naphthalate (PTN), poly(cyclohexylene dimethylene terephthalate) acid (PCTA), polybutylene terephthalate (PBT), polyamide (PA 6, PA 6,6, PA 6,12, PA 6,10, PA 4,6, PA 10, PA 11, PA 12; MXD6, and aromatic derivatives thereof), polyether ether ketone (PEEK), polyether ketone (PEK), poly(p-phenylene sulfide) (PPS/RYTON®), polyurethane, polysiloxane, and copolymers thereof.

In certain embodiments, the method of manufacturing the composition comprises two or more polymers selected from the group consisting of: polyethylene naphthalate (PEN), polyethylene terephthalate (PET), polybutylene naphthalate (PBN), polytrimethylene naphthalate (PTN), poly(cyclohexylene dimethylene terephthalate) acid (PCTA), and polybutylene terephthalate (PBT). In other embodiments, the method of manufacturing the composition comprises at least two polymer resins, wherein the silica glass beads are added simultaneously to the polymer resins, which are then extruded or spun. In further embodiments, the method of manufacturing the resin component composition further comprises a silicone additive, wherein a siloxane additive and the silica glass beads are added simultaneously to the polymer resins, which are then extruded or spun. In some embodiments, the method of manufacturing the composition comprises two or more polymers selected from the group consisting of: polyethylene naphthalate (PEN), polyethylene terephthalate (PET), polybutylene naphthalate (PBN), polytrimethylene naphthalate (PTN), poly(cyclohexylene dimethylene terephthalate) acid (PCTA), polybutylene terephthalate (PBT), polyamide (PA 6, PA 6,6, PA 6,12, PA 6,10, PA 4,6, PA 10, PA 11, PA 12; MXD6, and aromatic derivatives thereof), polyether ether ketone (PEEK), polyether ketone (PEK), poly(p-phenylene sulfide) (PPS/RYTON®), polyurethane, polysiloxane, and copolymers thereof. In further embodiments, the method comprises two or more polymers selected from the group consisting of: polyethylene naphthalate (PEN), polyethylene terephthalate (PET), polybutylene naphthalate (PBN), polytrimethylene naphthalate (PTN), poly(cyclohexylene dimethylene terephthalate) acid (PCTA), and polybutylene terephthalate (PBT).

In some embodiments, the instant invention relates to a method of manufacturing a resin component composition comprising a polymer resin, silica glass beads, wherein said silica glass beads are added simultaneously to said polymer resin, which is then extruded or spun, wherein the composition comprises one or more additives selected from the group consisting of: stabilizers, compatibilizers, hydrolysis or oxidation-resistant additives, dyes, and pigments. In other embodiments, the composition is extruded or spun into a component selected from the group consisting of fiber, yarn, rings, films, foil, tape, mesh, spiral link coil and netting; or is a structured deposit or coating.

In some embodiments, the instant invention pertains to a component of an industrial fabric, wherein the component comprises a resin component composition comprising at least one polymer resin and at least one type of silica glass bead, wherein about 4% to about 98% of the composition by weight comprises a polymer resin and about 1% to about 4% of the composition by weight comprises silica glass beads, optionally wherein the resin component composition comprises about 0.5% to about 5% by weight of a siloxane content additive. In certain embodiments, the component is selected from the group consisting of yarn, fiber, film, foil, tape, netting, mesh, ring, spiral link coil, structured deposit, and coating. In certain embodiments, the industrial fabric is selected from the group consisting of PMC forming, press, and dryer fabrics, process belts, impression fabrics; TAD fabrics; eTAD fabrics; and ATMOS machine fabrics. In some embodiments, the industrial fabric is selected from the group consisting of engineered fabrics, sleeves and belts used in the production of nonwoven fabrics by processes such as air laid, melt blowing, spunbonding, and hydroentangling fabrics used in a sludge filter and other wet filtration processes; conveyor belts; and corrugator belts. In some embodiments, the industrial fabric is selected from the group consisting of spiral coil links, their pintles and staffer yarns; fabrics and belts used in textile finishing processes; belts and fabrics used to produce building products; tannery belts, and tannery sleeves. In some embodiments, the fabric component is selected from the group consisting of fabrics woven from yarns in the MD and CD, nonwoven fabric layers of MD or CD yarn arrays, fabrics made from spiral links, or the spiral links themselves, mesh, netting, rings, foils, films, and other extruded elements.

In some embodiments, the instant invention relates to a mesh, netting, ring, film, fiber, or paper machine clothing comprising a resin component composition comprising at least one polymer resin and at least one type of silica glass bead, wherein about 4% to about 98% of the composition by weight comprises a polymer resin and about 1% to about 4% of the composition by weight comprises silica glass beads, optionally wherein the resin component composition comprises about 0.5% to about 5% by weight of a siloxane content additive. In certain embodiments, the fiber is suitable for use in the batt portion of an industrial fabric.

In yet other embodiments, the instant invention pertains to a reel belt, TAD, eTAD, ATMOS, DNT, PMC forming, press, and dryer fabric; process belts, impression fabric, belt filter, pulp washer cover, or belt to produce a building product comprising a resin component composition comprising at least one polymer resin and at least one type of silica glass bead, wherein about 4% to about 98% of the composition by weight comprises a polymer resin and about 1% to about 4% of the composition by weight comprises silica glass beads, optionally wherein the resin component composition comprises about 0.5% to about 5% by weight of a siloxane content additive.

In some embodiments, the instant invention relates to an engineered fabric; air laid, spun bond, melt spun, or hydroentangled fabric comprising a resin component composition comprising at least one polymer resin and at least one type of silica glass bead, wherein about 4% to about 98% of the composition by weight comprises a polymer resin and about 1% to about 4% of the composition by weight comprises silica glass beads, optionally wherein the resin component composition comprises about 0.5% to about 5% by weight of a siloxane content additive.

In other embodiments, the instant invention pertains to a corrugator belt, comprising a resin component composition comprising at least one polymer resin and at least one type of silica glass bead, wherein about 4% to about 98% of the composition by weight comprises a polymer resin and about 1% to about 4% of the composition by weight comprises silica glass beads, optionally wherein the resin component composition comprises about 0.5% to about 5% by weight of a siloxane content additive.

In some embodiments, the instant invention relates to a batt portion of press fabric or corrugator belt fabric comprising a resin component composition comprising at least one polymer resin and at least one type of silica glass bead, wherein about 4% to about 98% of the composition by weight comprises a polymer resin and about 1% to about 4% of the composition by weight comprises silica glass beads, optionally wherein the resin component composition comprises about 0.5% to about 5% by weight of a siloxane content additive.

In some embodiments, the instant invention relates to a stuffer yarn or pintle comprising a resin component composition comprising at least one polymer resin and at least one type of silica glass bead, wherein about 4% to about 98% of the composition by weight comprises a polymer resin and about 1% to about 4% of the composition by weight comprises silica glass beads, optionally wherein the resin component composition comprises about 0.5% to about 5% by weight of a siloxane content additive.

Terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the disclosure are described in or are obvious from (and within the ambit of the disclosure) the following disclosure.

BRIEF DESCRIPTION OF THE DRAWINGS

The accompanying drawings, which are included to provide a further understanding of the disclosure, are incorporated in and constitute a part of this specification.

FIG. 2 depicts SEM cross section images (top—paper side view and bottom—cross section view) of an inventive monofilament with silica E-glass beads embedded therein.

FIG. 9 depicts images showing the contact angle measurement of water on a 100% PET monofilament as 61-63 degrees, and on 10% PBTXXX062813C1 (a silica A-glass bead in PBT containing abrasion-resistant PET monofilament) as 74.7 degrees.

FIG. 12 shows tear strength (measured in minutes to failure) of 4 different fabrics with the same weave, mesh, count and yarn diameters, such as one with PET standard yarns and the same size yarn of PET with 2% silica A-glass beads, and one with HYTREL® resin yarns and one with the same HYTREL® and 2% silica A-glass beads.

As shown in FIG. 14, yarns are worn completely through and broken.

DETAILED DESCRIPTION OF THE DISCLOSURE

Figure 1:
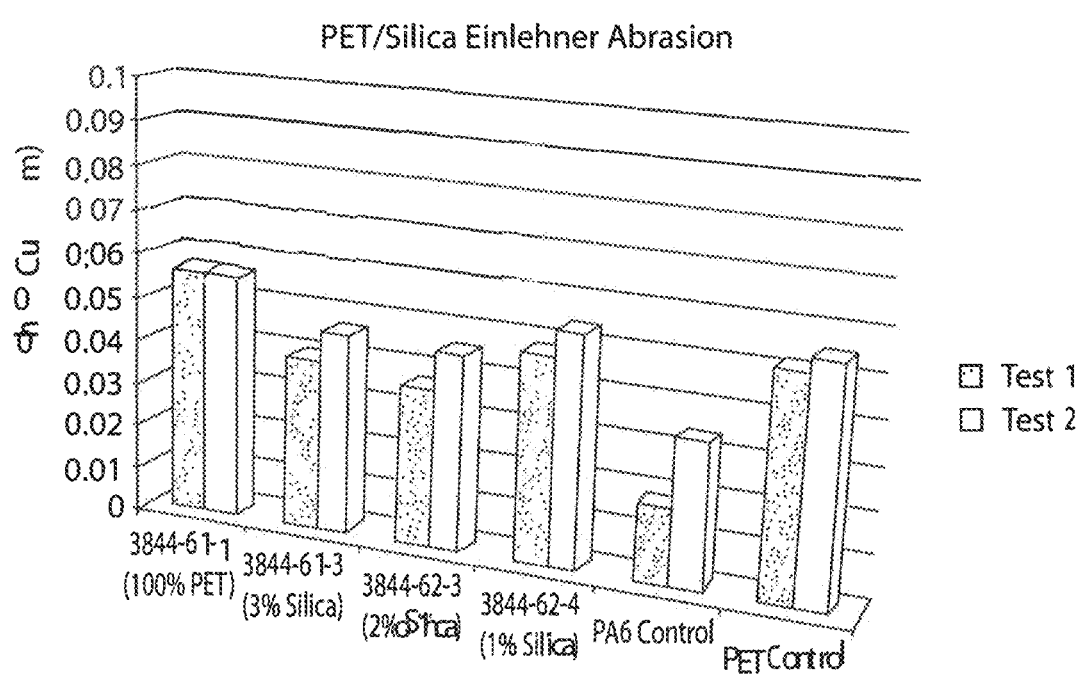
FIG. 1 is an Einlehner Abrasion graph comparing the depth of cut (mm) of different monofilaments-comprising 100% PET, the same PET with 3% silica, 2% silica, or 1% silica, respectively (each containing silica A-glass beads); a PA6 control, and a PET control.

The present disclosure combines one or more materials to a polymer resin in a synergistic manner, such that the properties (for example, break strength, elongation, etc.) of the components comprising the resin are at least maintained, and such that the combination of the one or more additive materials offers a synergistic positive effect of increasing the component's abrasion-resistant properties. Generally, the additive materials comprise silica particles. More specifically, the additive materials comprise silica glass beads. The synergistic effect seen by combining at least one type of silica glass bead additive with a polymer resin is a surprising and unexpected result of the instant disclosure when the component is present, for example, in an industrial fabric.

In the industrial fabric and belts aforementioned, the component of the present disclosure can be used to make extruded yarns for a woven structure, MD or CD yarn arrays, or to make the yarn used to manufacture spiral coil links, the pins or pintles used to link the coils together, or stuffer yarns (see, for example, U.S. Pat. No. 4,567,077); to make a mesh or netting (see, for example, Johnson et al., U.S. Pat. No.

4,427,734); to make rings (see, for example, Hansen et al., U.S. Pat. No. 6,918,998); or other extruded elements (see, for example, Hansen et al., U.S. Pat. No. 6,630,223); films or foils such as taught in U.S. Pat. Nos. 8,388,812; 8,728,280; 8,764,943; and 8,394,239; to make yarns to be used in the pins or pintles to join the ends of on machine seamable fabrics together; to make fiber for use in structures such as the batt portion of a press fabric or a corrugator belt; to make a controlled structured deposition on the surface of a belt or fabric; or to coat (and/or impregnate) one or both surfaces of a belt or sleeve (e.g., sheet contact surface or machinery contact surface).

The component can be used in structures such as: PMC (forming fabrics, press fabrics, dryer fabrics, shoe press belts, or transfer belts), reel belts, TAD fabrics, impression fabrics, Energy Efficient Technologically Advanced Drying ("eTAD") fabrics, Advanced Tissue Molding Systems ("AT-MOS") fabrics; or engineered fabrics such as double nip thickeners ("DNT") fabrics, belt filters, pulp washers, belts/fabrics/sleeves for the production of nonwovens (for example, airlaid, spunbond, melt spun, hydroentangled), belts to produce building products (for example, oriented strand board ("OSB")), corrugator belts, textile finishing belts (for example, sanforizing belts), and tannery belts or sleeves.

In certain embodiments, the present disclosure improves the abrasion resistance properties, for example, of the component by blending at least one polymer with at least one type of silica glass bead additive during or before the extrusion, spinning, deposition, or coating process. The inventors have discovered a synergistic effect of these silica glass bead additives on components comprising polymer resins such as polyester with industrial fabric applications such as a component used in paper machine clothing. Because of the need for improved abrasion resistance, while at least maintaining the other desired properties of the component, one aspect of the present disclosure is the production of monofilaments made from at least one polymer, such as a polyester resin, with at least one silica glass bead additive for use in yarns for industrial fabrics.

In certain embodiments, the present disclosure relates to a yarn or fiber having excellent abrasion-resistant properties, which comprises, at least one polymer, such as a polyester resin, and at least one type of silica glass bead additive, combined to produce a monofilament yarn composition. The present disclosure further relates to filaments, films, foils, tapes, netting, meshes, rings, spiral link coils or other extruded or spun elements, a structured deposit in a desired pattern, or a coating (either the deposit or coating can be continuous on a surface, or discontinuous in a desired pattern (for example, rectangles), or side by side continuous or discontinuous MD or CD strips wherein the edges of the adjacent strips are not in contact with each other, e.g., there is a "space" in between adjacent strips) produced by using this polymer resin and silica glass bead composition. The strips can also be at an angle to the MD, and/or can be curved, zigzagged, or sinusoidal in shape.

In some embodiments, the present disclosure involves combining at the same time one or more silica glass bead additives with one or more polymeric materials, all of which is then extruded or spun. There may be additional additives in the mixture, such as stabilizers, compatibilizers, hydrolysis or oxidation-resistant additives, dyes, and/or pigments. The polymeric material mixture is then extruded or spun into fiber, yarn, rings, films, foils, meshes, nettings, or other elements. The inventive material composition can also be used as a structured deposit or as a coating (either the deposit or coating can be continuous on a surface, or discontinuous in a desired pattern (for example, rectangles), or side by side continuous or discontinuous MD or CD strips wherein the edges of the adjacent strips are not in contact with each other, e.g., there is a "space" in between adjacent strips) as a component of an industrial fabric or belt. The strips can also be at an angle to the MD, and/or can be curved, zigzagged, or sinusoidal in shape. The strips can be as narrow as 0.1 mm or as wide as several millimeters (measured in the CD if they are MD strips; measured in the MD if they are CD strips).

The structured deposit can be created by techniques such as droplet deposition (see U.S. Pat. No. 7,005,044 for example), extrusion, rotary screen printing or the like.

For example, the industrial fabric may be a corrugator belt used on a machine producing corrugated boxboard. The surface of the belt, which can be a woven structure, a woven structure with needled in batt fiber on the sheet and/or machine contact sides, or a spiral link structure, which has deposited on the sheet contact surface a plurality of MD strips of the inventive resin composition. The strips can be in the MD, at an angle to the MD, or in the CD. The strips can also be at an angle to the MD, and can be curved, zigzagged or sinusoidal in shape. The adjacent strip edges are not contacting each other but there is a space to allow air and water vapor permeability through the belt.

The use of the improved abrasion resistant material makes the deposition more durable, and therefore the functionality of the belt (assisting in pulling the corrugated board through the machine) lasts longer.

The industrial fabric may also be a transfer belt. It is important that such belts exhibit excellent controlled sheet release and that the surfaces remain contaminant free. Transfer belts are coated on both sides (and sometimes impregnated as well) to achieve these properties. The coating can be applied separately to both sides, or from one side and allowed to impregnate the structure, or a combination of both. The machinery contact side should typically have sufficient roughness to prevent hydroplaning, and therefore not exhibit instability or poor guiding. The roughness can be achieved by grooving, for example. In a particular embodiment, polyurethane is the preferred coating resin. The functionality of the belt, especially sheet release, only lasts as long as the coating lasts, and its durability (abrasion resistant property) can be improved utilizing a composition comprising polyurethane and the silica glass bead content material in the coating.

The silica glass bead additives may be mixed with any suitable polymer, such as one or more polyesters (e.g., PET, PBT, PEN, PCTA, etc.), polyamides (e.g., PA 6; PA 6,6; PA 6,12; PA 6,10; PA 4,6; PA 10; PA 11; PA 12 or polyaramid derivatives like NOMEX®), polyether ether ketone (PEEK), and/or polyether ketone (PEK), poly(p-phenylene sulfide) (PPS or RYTON®), or polyurethanes. The silica glass bead additives may also be mixed with two or more suitable polymers, such as two or more polyesters (e.g., PET, PBT, PEN, PCTA, etc.), polyamides (e.g., PA 6; PA 6,6; PA 6,12; PA 6,10; PA 4,6; PA 10; PA 11; PA 12 or polyaramid derivatives like NOMEX®), polyether ether ketone (PEEK), and/or polyether ketone (PEK), poly(p-phenylene sulfide) (PPS or RYTON®), polyurethanes, any copolymers (e.g., HYTREL®) thereof, and any combination or blend thereof (e.g., PET/polyurethane, PET/polysiloxane, etc.). Other additives may be mixed in with the silica glass beads, including but not limited to, polysiloxanes (e.g., polydimethylsiloxane (PDMS), PDMS derivatives, polydiphenylsiloxane, cyclic polysiloxanes, aminoalkyl polysiloxanes, etc.).

The polymer composition may then be used as a component in industrial fabric structures such as PMC (forming fabrics, press fabrics, dryer fabrics, shoe press belts, or transfer belts), reel belts, TAD fabrics, impression fabrics, eTAD fabrics, and ATMOS fabrics; and engineered fabrics such as DNT fabrics, belt filters, pulp washers, belts/fabrics/sleeves for the production of nonwovens (for example, airlaid, spunbond, melt spun, hydroentangled), belts to produce building products (for example, oriented strand board ("OSB"), corrugator belts, textile finishing belts (for example, sanforizing belts), and tannery belts or sleeves).

The present disclosure, according to one embodiment, is a component comprising a blend of: (1) a polyester selected from a group including but not limited to, e.g., polyethylene naphthalate (PEN), polyethylene terephthalate (PET), polybutylene naphthalate (PBN), polytrimethylene naphthalate (PTN), polybutylene terephthalate (PBT), poly(cyclohexylene dimethylene terephthalate) acid (PCTA), or copolymers and blends of polyesters; and (2) a silica particle additive selected from a group including but not limited to, e.g., E-glass silica beads, and A-glass silica beads. The component composition optionally contains other additives and ingredients.

Optionally, stabilizers, such as a carbodiimide (e.g., Stabaxol® 1LF, PX-100, or PX-200), fillers, tensile modifiers, compatibilizers, hydrolysis or oxidation-resistant additives, dyes, and/or pigments or other additives may be used. In embodiments where the resin component composition is used to produce a monofilament yarn, the monofilament yarn composition then is typically suitable for all yarn types used in the aforementioned industrial fabrics.

As a monofilament disclosed herein, it may be used as warp and/or weft yarns in the production of industrial fabrics such as paper machine clothing and engineered fabrics aforementioned, as the monofilament to produce spiral links, as the pintles or pins for both on machine seamed fabrics, as a stuffer yarn in fabrics and spiral link belts (of a round or polygonal cross section), as a binder yarn in some multilayer woven fabrics, and as a yarn in a MD or CD yarn array. As a filament, it may also be further processed and cut into fiber used in batt material that may be attached to the base structure of some of these fabrics.

In certain embodiments, the mixture of polyester and silica glass bead content material provides the monofilament or fiber with improved abrasion resistance. The above disclosed composition can also be used to produce any of the other aforementioned components according to other embodiments of the disclosure. These include fibers, filament yarns, films, foils, tapes, netting (mesh), rings, spiral link coils or other extruded or spun elements, a structured deposit in a desired pattern, or a coating (either the deposit or coating can be continuous on a surface, or discontinuous in a desired pattern (for example rectangles), or side by side continuous or discontinuous MD or CD strips; or continuous or discontinuous strips at an angle to the MD or CD, any/or of which may be curved, zigzag or sinusoidal, wherein the edges of the adjacent strips are not in contact with each other, e.g., there is a "space" in between adjacent strips).

In embodiments of the inventive composition where the polyester is PET, water contact angle testing of PET monofilaments has shown that the addition of silica glass beads to the PET resin during or before the extrusion process results in a higher water contact angle (74.7 degrees) when compared to a 100% (of the same PET) monofilament (contact angle only 61-63 degrees). See FIG. 9. Typically, the water contact angle of the instant monofilament composition is greater than 74 degrees. In particular embodiments, the use of the silica glass bead additive works in two ways: (1) it improves abrasion resistance (the desired outcome) and (2) it increases hydrophobicity.

In some embodiments, there may be additional additives in the mixture, such as stabilizers, compatibilizers, hydrolysis or oxidation-resistant additives, dyes, and/or pigments. The polymeric material mixture is then extruded or spun into fiber, yarn, rings, films, foils, mesh, netting, or other forms. The inventive material composition can also be used as a structured deposit or as a coating (either the deposit or coating can be continuous on a surface, or discontinuous in a desired pattern (for example, rectangles), or side by side continuous or discontinuous MD or CD strips wherein the edges of the adjacent strips are not in contact with each other; e.g., there is a "space" in between adjacent strips) as a component of an industrial fabric or belt.

In the embodiments, the overall silica glass bead content in the component is typically at least about 1%; or at least 1.34%; or at least 2%; or at least 3%; or at least 4%; or greater than 4%.

In the embodiments, silica glass beads are typically less than 10 microns in average particle size diameter.

In certain embodiments, silica glass beads are between 0.01-10 microns in average particle size diameter. In additional embodiments, silica glass beads are between 0.1-10 microns in average particle size diameter. In further embodiments, silica glass beads are between 1-10 microns in average particle size diameter.

Silica glass beads are glass beads comprising silica. Optionally, silica glass beads also comprise metals, metal oxides, or other metal derivatives. A-glass ("A" for "alkali-lime") is a silica glass that has alkali metal oxide content (more than about 2.0%). E-glass ("E" for initial electrical application) is a silica glass that is substantially alkali metal-free (less than about 2.0%). Other types of silica glass beads include, but are not limited to, C-glass, R-glass, S-glass, and M-glass. See Matinlinna, J. P., Glass Fibers in Fiber-Reinforced Composites, Handbook of Oral Biomaterials 264 (2014).

In some embodiments, the silica glass beads used in the compositions of the disclosure are either or both A-glass and E-glass beads. In addition, other types of silica glass beads may be added. In other embodiments, the silica glass beads are both A-glass and E-glass silica beads. In still other embodiments, silica glass beads are only A-glass beads. In yet other embodiments, the silica glass beads are only E-glass beads.

In an additional embodiment, the silica glass beads are embedded in a polymer carrier. In a certain embodiment, the silica glass beads are embedded in a PBT carrier.

In another embodiment, the combination of the polymer resin and silica glass beads may be mixed with any suitable siloxane such as one or more polysiloxanes.

In certain embodiments, the combination of the polymer resin and silica glass beads may be mixed with a suitable fluoropolymer.

In a further embodiment, the aforementioned combination of materials are extruded or spun into various forms including, but not limited to, monofilaments, films, foils, meshes, nettings, sheets, etc.

In Another Embodiment, the Polymer Resins May be any Polyester, any Polyamide, PEEK, PEK, PPS, Polyurethane, and/or Blends Thereof (e.g., PET/PBT Blend and PET/PU Blend).

In another embodiment the silica glass beads are substantially spherical.

In some embodiments, the composition comprises 20%-98% of polymer resin.

In another embodiment, the composition to comprises 1%-5% of siloxane.

In yet another embodiment, the composition comprises 1%-4% silica glass beads.

In a particular embodiment, the composition comprises:
(1) 2% silica glass beads;
(2) 2% siloxane;
(3) 6% PBT;
(4) 1% carbodiimide; and
(5) 89% PET In another embodiment, the monofilament yarn has a round cross-section. In yet another embodiment, the monofilament yarn has a non-round cross-section.

In another embodiment, the abrasion resistance of the monofilament yarn is improved at least 5% compared to said monofilament yarn made without silica glass beads. In an additional embodiment, the abrasion resistance of the monofilament yarn is improved at least 10% compared to said monofilament yarn made without silica glass beads. In a further embodiment, the abrasion resistance of the monofilament yarn is improved at least 15% compared to said monofilament yarn made without silica glass beads. In yet another embodiment, the abrasion resistance of the monofilament yarn is improved at least 20% compared to said monofilament yarn made without silica glass beads.

The composition according to the present disclosure is also suitable for the production of all the other aforementioned components that can be used in the manufacture of PMC; engineered fabrics used in a sludge filter or other wet filtration process; base support structures for industrial process belts, such as conveyor belts for industrial uses such as food processing or mining; corrugator belts; spiral coil links for spiral link belts, their pintles or any stuffer yarns; or fabrics used in textile finishing processes, and a method of manufacturing the same. Any of the above structures comprising yarns can be woven or not woven, including spiral coil link structures as well as MD/CD yarn arrays. Further, the monofilament yarn compositions may be used as stuffers and pintles for both spiral link fabrics (stuffers) and all seams (e.g., pin seams, spiral, etc.).

For purposes of this disclosure, AIX-1390 is abrasion resistant monofilament yarn made with A-glass silica particles and PET, AIX-1391 is abrasion resistant monofilament yarn made with E-glass silica particles and PET, AIX-1394 is abrasion resistant monofilament yarn made with E-glass silica particles and PET, AIX-1395 is abrasion resistant monofilament yarn made with A-glass silica particles and polyamide.

The disclosure will now be described by the following non-limiting examples:

TABLE 1

Properties of some monofilaments:

| SAMPLE ID | Tenacity (gpd) | Strain @ 3 gpd (%) | Break Strain (%) | 200 C. Shrink (%) |
|---|---|---|---|---|
| 0.50 mm AIX-1390 abrasion resistant - "A" glass with siloxane and PET | 4.6 | 10.1 | 23.3 | 8.2 |
| 0.50 mm S-70 standard product (100% PET) | 4.8 | 9.9 | 24.0 | 7.5 |
| 0.85 mm AIX-1391 abrasion resistant - "E" glass with siloxane, PET, and carbodiimide | 4.2 | 6.7 | 14.8 | 21.0 |
| 0.85 mm HRS310 standard PET product (has only carbodiimide) | 4.7 | 5.7 | 15.1 | 24.0 |

PET monofilament samples were produced in a diameter of 0.20 mm containing 0%, 1%, 2%, and 3% micron-sized A-glass silica particles. The monofilament physical properties and abrasion resistance of each sample are below.

PET/Silica Physical Properties

| | 100% PET (3844-61-1) | 3% Silica (3844-61-3) | 2% Silica (3844-62-3) | 1% Silica (3844-62-4) |
|---|---|---|---|---|
| 200 C. Shrink (%) | 12.5 | 12.85 | 12.9 | 12.8 |
| Tenacity (gpd) | 6.518 | 5.696 | 5.817 | 6.174 |
| Strain @ 2 gpd (%) | 2.30 | 2.60 | 2.56 | 2.47 |
| Break Strain (%) | 15.6 | 15.0 | 14.9 | 15.2 |
| Modulus (gpd) | 108.2 | 102.1 | 102.8 | 103.1 |

(PBTXXX062813C1) Composition of A-Glass Concentrate Embedded in PBT Carrier with Siloxane:

| Common Name | Chemical Name or Formula | Percent |
|---|---|---|
| Polybutylene Terephthalate | Polybutylene Terephthalate | 60% |
| Glass Oxide, A-Glass Beads | $SiO_2$ | 20% |
| Siloxane | Polydimethylsiloxane | 20% |

(PBTXGB022113A1) Composition of A-Glass Concentrate Embedded in PBT Carrier:

| Common Name | Chemical Name or Formula | Percent |
|---|---|---|
| Polybutylene Terephthalate | Polybutylene Terephthalate | 70% |
| Glass Oxide, A-Glass Beads | $SiO_2$ | 30% |

(PBTXGB090814A1) Composition of E-Glass Concentrate Embedded in PBT Carrier with Siloxane:

| Common Name | Chemical Name or Formula | Percent |
|---|---|---|
| Polybutylene Terephthalate | Polybutylene Terephthalate | 60% |
| Glass Oxide, E-Glass Beads | $SiO_2$ | 20% |
| Siloxane | Polydimethylsiloxane | 20% |

Abrasion Testing of Forming Fabric Samples

Three forming fabric samples were subjected to abrasion testing. The samples were marked Trial 1 J5076 S-32 PET 2200029, Trial 2 J5076 PET/silica A-glass beads 3850-37.25 2200029, Trial 3 J5076 532/AIX-1368, PA6 (polyamide) 2210932 30378896-20 (alternating polyester and polyamide). One Q13 (same as J5076 but has "Q13" code in final fabric) forming fabric standard style was also tested as a reference. PET is the yarn type for the code "J5076." The Trial 1 monofilament was made as a control on the same day as the inventive monofilament, and was made on the same extruder. The Trial 1 monofilament did not contain silica glass bead additive. The Trial 2 monofilament sample J5076 PET/Silica 3850-37.25 2200029 contained 2% A-glass beads and 2% siloxane. The Trial 3 monofilament did not contain silica glass bead additive.

Test Method

Two pieces of each sample were tested in a forming fabric abrasion tester. One Q13 forming fabric standard style was also run to compare with the test samples. In this tester, the forming fabric sample is wrapped over a rotating roll with a ceramic coating and is loaded under tension in the machine direction with 8 kN/m. Water containing 1.0% (250 g) of the filler is sprayed over the sample. The running time to fabric failure due to breaking/tearing was measured. The filler used was calcium carbonate (chalk, GCC) called Sjöhästen FF.

Results

Figure 10:
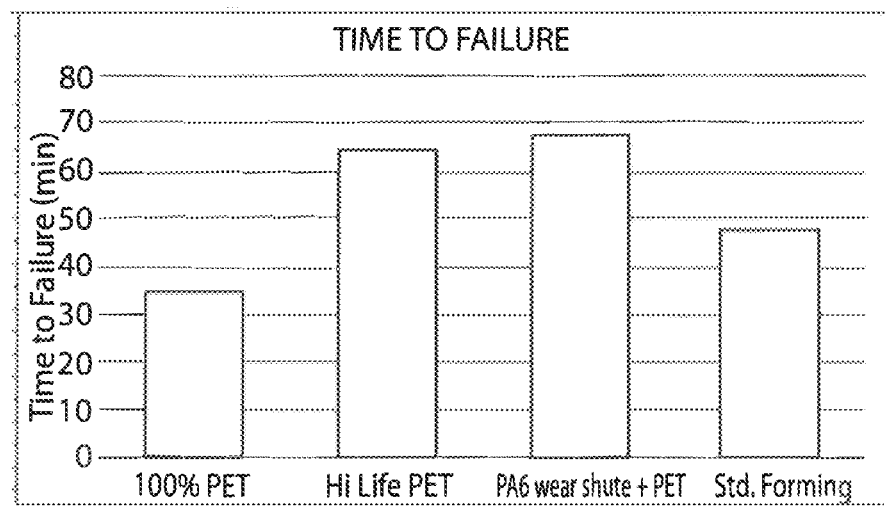
FIG. 10 is a chart showing the abrasion resistance results of a fabric made with the inventive abrasion resistant monofilaments (the "Hi Life PET fabric") versus ones made with different standard monofilaments. These samples were all comprising 0.25 mm PET polymer yarns and a PA6 control woven in the fabrics. Depicted is a chart of time to failure of fabrics woven with shute monofilaments: 100% PET (Trial 1 2200029), Hi-Life PET (Trial 2 2200029), alternating PA6 and PET wear shutes (Trial 3 2210932), and Standard Forming (Q13 Standard).

Running time (min) to tear (FIG. 10)

| Samples number | Running time (min) |
| --- | --- |
| Trial 1 2200029 | 35 and 35 |
| Trial 2 2200029 | 61 and 67 |
| Trial 3 2210932 | 67 and 68 |
| Q13 our standard | 46 and 51 |

Each test was run until the sample tore and then the filler solution was replaced. Two pieces of each sample were run. Trial 2 is an inventive fabric according to an embodiment of the disclosure. Trial 1 is a control sample and Trial 3 is made of polyamide of the same size as the other two trials. The silica used in these trials was A-Glass. Trial 2 sample J5076 PET/Silica 3850-37.25 2200029 was processed into a monofilament using a blend of 0.95 IV PET resin (90%) and the A-glass bead/siloxane additive from Foster Corp. (PBTXXX062813C1) at 10%.

Micron-sized silica (<10 microns) (A-glass) beads and siloxane were added to PET resin via the addition of a PBT/silica/siloxane concentrate from Foster Corporation (PBTXXX062813C1) into the polymer melt during the monofilament extrusion process.

Figure 5:
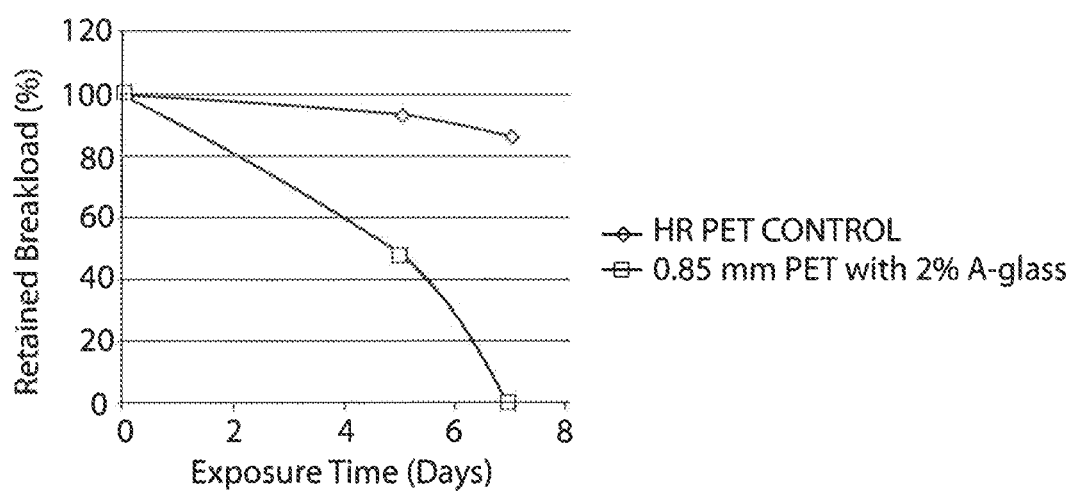
FIG. 5 depicts the results of hydrolysis testing of inventive yarns including the inventive 0.85 mm PET monofilament with 2% silica A-glass beads versus a 0.85 mm HR PET monofilament control.

From this test, it appears that the other monofilament physical properties are not significantly changed when 1%, 2%, or 3% of the micron-sized A-glass beads are blended into the PET monofilament. See Table 1. The abrasion resistance of the fabrics comprising the inventive PET monofilament with the 2 and 3% level A-glass beads is improved by about 20% compared to a fabric comprising 100% PET monofilament. See FIG. 1. This is a significant improvement in fabric abrasion resistance and brings the abrasion resistance closer to fabrics woven with polyamide CD monofilaments without sacrificing the high CD dimensional stability (tensile) and low moisture uptake properties of polyester monofilaments. But hydrolysis resistance testing of a 0.85 mm PET/A-glass monofilament shows inadequate hydrolysis resistance for use in the dryer section of a paper machine. See FIG. 5.

Micron-sized silica (<10 microns) (A-glass) beads were also added to PET monofilaments via the addition of a PBT/silica concentrate from Foster Corporation (PBTXGB022113A1) into the polymer melt before or during the extrusion process.

Figure 6:
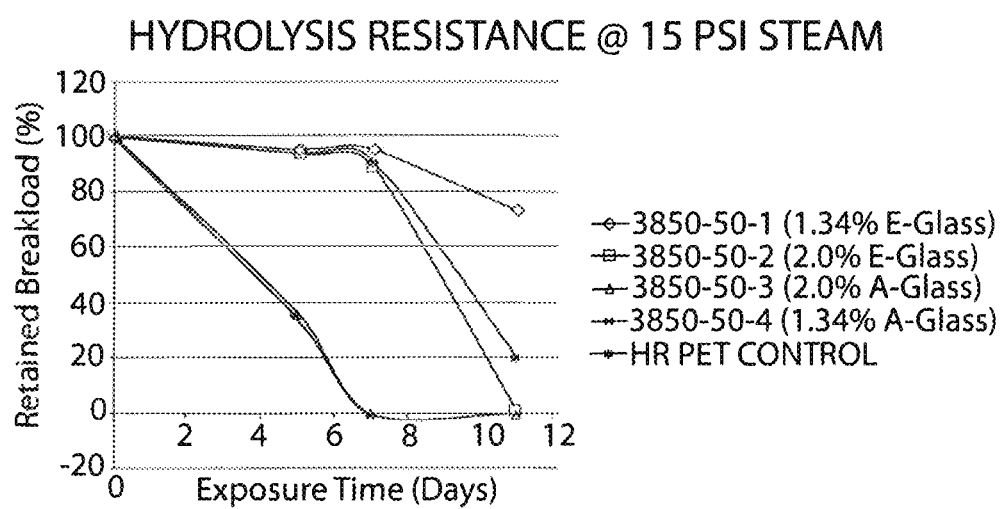
FIG. 6 is a graph depicting the results of hydrolysis testing of the inventive monofilament yarns with standard yarns of the same diameters including PET yarns with 1.34% silica E-glass beads (3850-1), 2.0% silica E-glass beads (3850-50-2), 2.0% silica A-glass beads (3850-50-3), and 1.34% silica A-glass beads (3850-50-4), respectively, and a HR PET control yarn.

Further testing of different silica concentrates from Foster Corporation showed that the use of a specific type of silica called "E-glass" in PET monofilaments exhibits improved monofilament abrasion along with adequate hydrolysis resistance, allowing the use of PET monofilaments loaded with "E-glass" beads in fabric applications where hydrolysis resistance is not needed (e.g., forming section of a paper machine) or in applications where hydrolysis resistance is needed (e.g., dryer section of a paper machine). "A-glass" beads may also be used in applications where hydrolysis resistance is not needed. See FIG. 6.

Further to improving the abrasion resistance as well as improving frictional properties (reducing fabric drag over stationary elements and subsequent drive load) on the machine parts, a polymer blend was created that has silica glass beads and high molecular weight siloxane. By adding siloxane, the frictional properties of the monofilament yarn also improved. The siloxane added in the additive compound was Genioplast Pellet "S" from Wacker, but any other high molecular weight siloxane can be added.

The composition of the masterbatch that has silica in the form of A or E-glass beads and siloxane can be:
(1) Silica (A or E-glass): 1-30%;
(2) High Mol. Wt. Siloxane: 0-4%; and
(3) Polybutylene Terephthalate Resin: 20-98%
(NOTE, the masterbatch is then added to the PET resin during extrusion)

These silica glass beads can be round or spherical in shape. This kind of masterbatch concentrate can be used with all thermoplastics, including but not limited to, e.g., polyamides (Nylon 6, Nylon 6,6, Nylon 6,10, Nylon 6,12, etc.), polyesters (PBT, PET, PEN, PTI, etc.), copolyesters like THERMX®, HYTREL®, ARNITEL®, etc., and high melting temperature polymers like PPS, PEEK, polyurethanes, etc.

Figure 7:
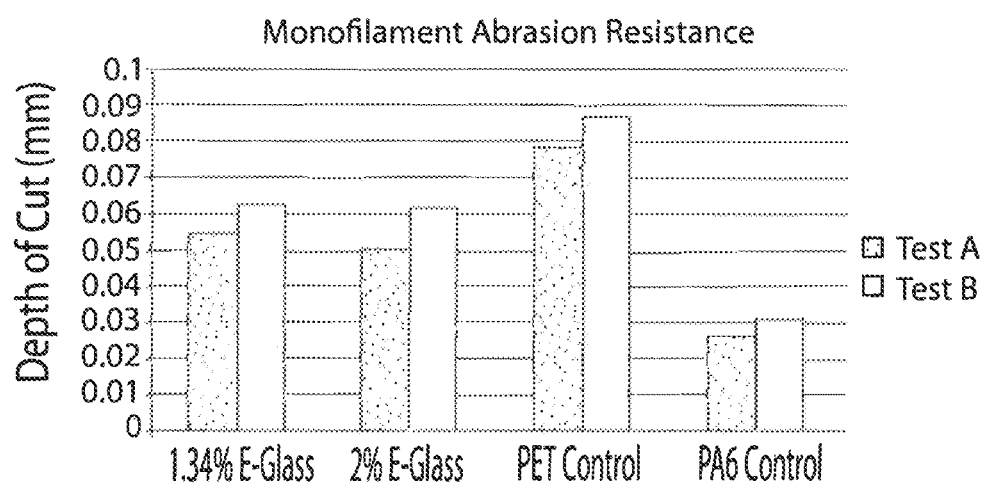
FIG. 7 is an Einlehner Abrasion resistance graph depicting the monofilament yarn abrasion resistance of yarns comprising PET with 1.34% silica E-glass beads and 2% silica E-glass beads, respectively, and 100% PET and 100% PA6 control yarns, all of the same diameter.
Figure 11:
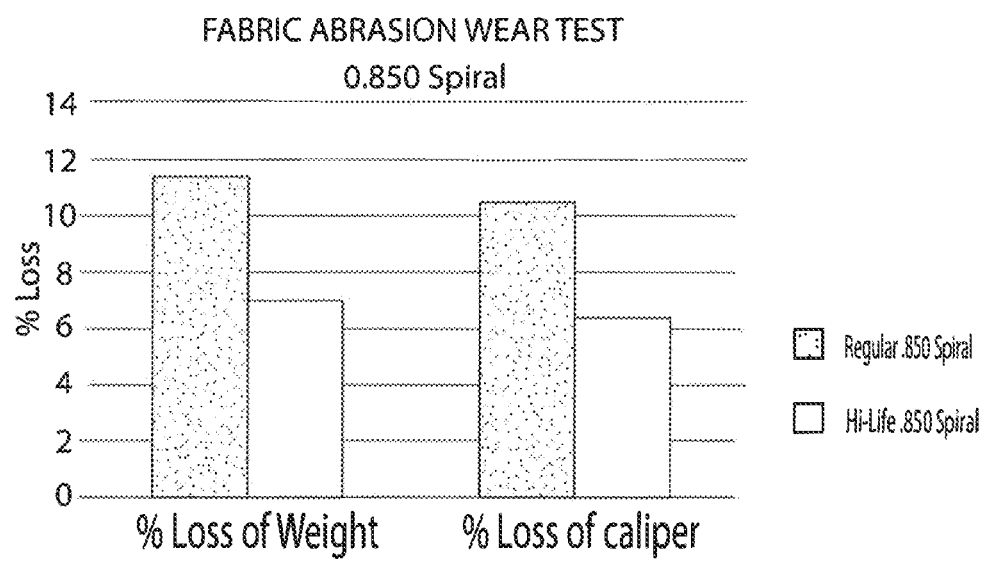
FIG. 11 is a chart showing the percent loss of weight and caliper (thickness) of regular standard 0.85 mm PET versus Hi-Life PET, which is the inventive abrasion resistant PET. These samples were of spiral link fabrics made with the respective 0.85 mm yarn formed into spiral links. Depicted is an abrasion resistance comparison of 0.85 mm monofilament for spiral link fabrics. Lower weight and caliper loss is better for the inventive yarn. "Regular" is a spiral link fabric produced using polyester monofilament without glass beads.

These kinds of monofilaments (or other component form) can be used in any application where better, improved abrasion resistance is needed. This will reduce the wear of the industrial fabrics and belts and improve their longevity and performance. The abrasion/wear tests showed at least 30-40% improvement in the life of the fabric both in terms of caliper (thickness) and weight loss. See FIGS. 7 and 11.

Figure 8:
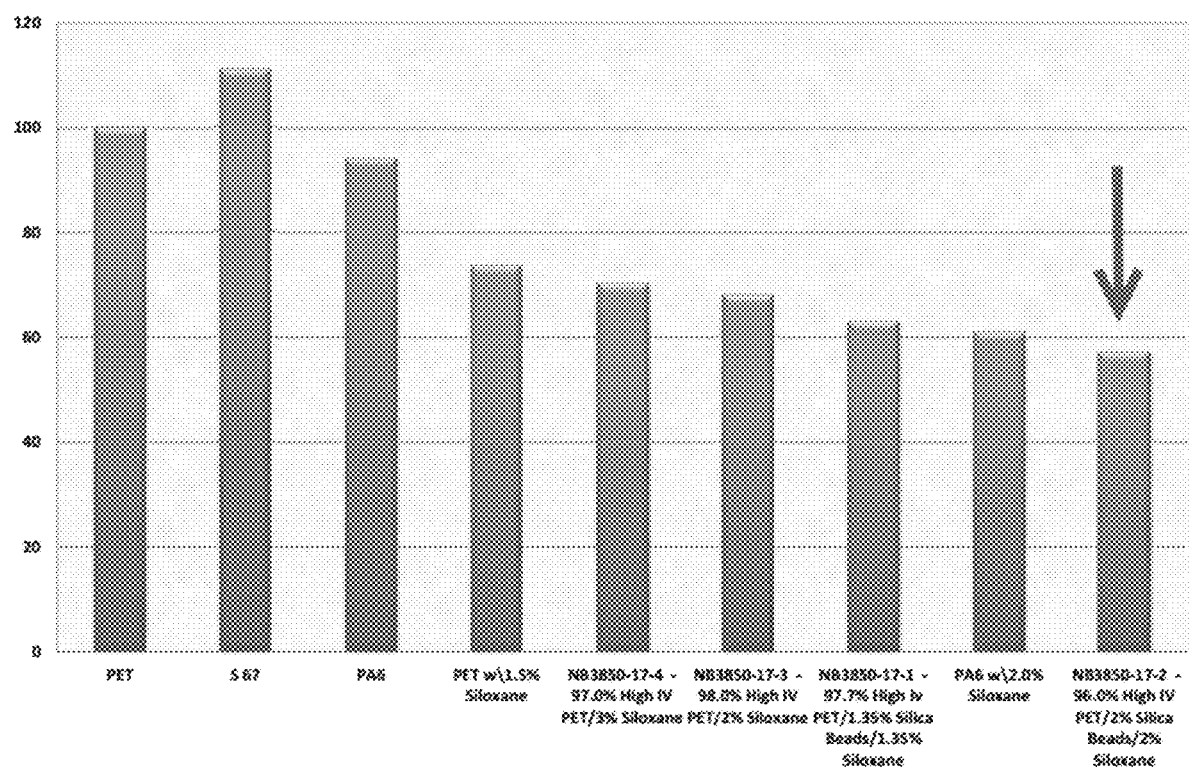
FIG. 8 is a graph depicting the coefficient of friction percent difference from a PET standard monofilament yarn compared to yarns of the same diameter including: S-67 (polyamide/polyurethane copolymer), PA6, the same PET containing 1.5% siloxane, NB3850-17-4 97.0% high IV (intrinsic viscosity) PET containing 3.0% siloxane, NB3850-17-3 98.0% high IV PET containing 2.0% siloxane, NB 3850-17-1 97.3% high IV PET containing 1.35% of the silica E-glass beads and 1.35% siloxane, PA6 containing 2.0% siloxane and NB3850-17-2 96.0% high IV PET containing 2.0% of the silica E-glass beads and 2.0% siloxane.

Hydrolysis testing of silica-loaded products has shown that specific types of silica glass beads will be preferred so that use in PET monofilaments to be exposed to high temperature steam is viable. Hydrolysis testing results are reported from monofilaments each loaded with a different type of silica bead (E-glass or A-glass) at 1.34% and 2.0% loading along with an additive to prevent hydrolysis and a siloxane additive to reduce the coefficient of friction. See FIGS. 5, 6, and 8.

The results again show that PET monofilament loaded with A-glass beads (3850-50-3 and 4) has no positive affect on the hydrolysis resistance of the monofilament. Samples 3850-50-1 and 2 are loaded with E-glass beads. The hydrolysis resistance of samples 3850-50-1 and 2 (E-glass beads) are shown to be equivalent to a PET control monofilament suitable for use in a high temperature steam environment such as the dryer section of a paper making machine.

Sample Compositions:
3850-50-1: 1.34% E-glass/2% siloxane/1.25% carbodiimide in 0.72 IV (Intrinsic Viscosity) PET
3850-50-2: 2% E-glass/2% siloxane/1.25% carbodiimide in 0.72 IV PET
3850-50-3: 2% A-glass/2% siloxane/1.25% carbodiimide in 0.72 IV PET
3850-50-4: 1.34% A-glass/2% siloxane/1.25% carbodiimide in 0.72 IV PET The monofilament abrasion resistance of PET monofilament loaded with E-glass type silica was found to be better than the Einlehner abrasion resistance of the 100% PET control monofilament. See, e.g., FIGS. 1, 7, and 8.

SEM images (showing a paper side view and a cross section view) of monofilament yarns containing E-glass beads indicate the distribution of E-glass beads within the monofilament yarn. See FIG. 2.

Figure 3:
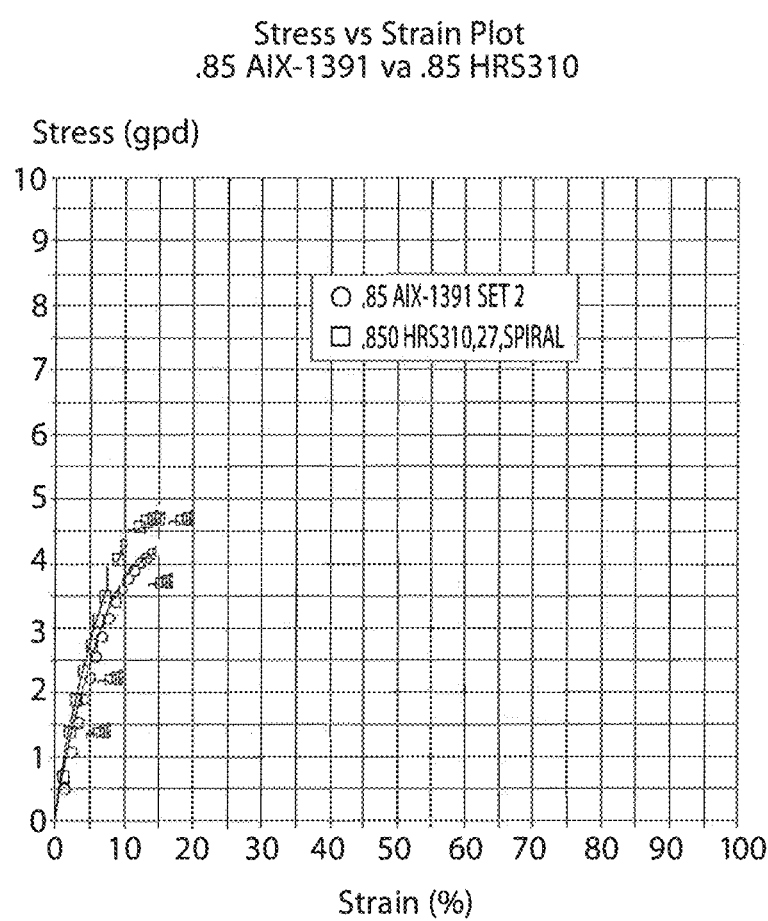
FIG. 3 depicts a stress versus strain plot of two monofilaments: the inventive 0.85 mm AIX-1391 (with silica E-glass beads) monofilament versus a 0.85 mm HRS310 polyester (HR as used herein stands for "Hydrolysis Resistant") monofilament.

A stress versus strain plot of two monofilaments, the inventive 0.85 mm AIX-1391 (with E-glass beads) versus a 0.85 mm HRS310 polyester (HR=Hydrolysis Resistant), indicates that the two monofilaments have similar stress/strain properties. See FIG. 3.

Figure 4:
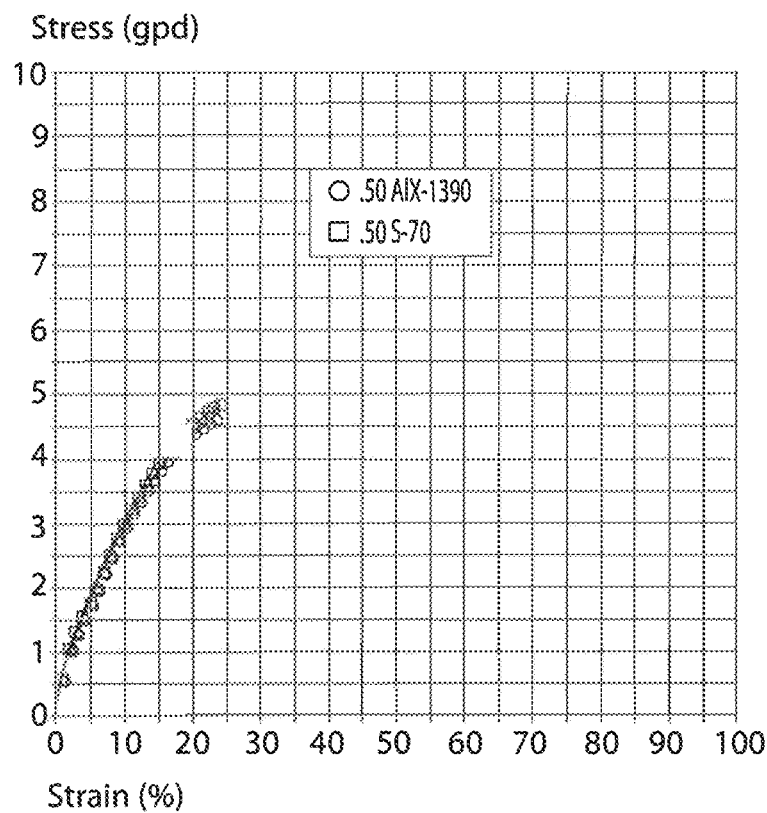
FIG. 4 depicts a stress versus strain plot of the inventive 0.50 mm AIX-1390 (with silica A-glass beads) monofilament versus 0.50 mm S-70 monofilament.

A stress versus strain plot of the inventive 0.50 mm AIX-1390 (with A-glass beads) monofilament versus a standard 0.50 mm S-70 monofilament indicates that the two monofilaments also have very similar tensile properties. See FIG. 4.

The percent loss of weight and caliper (thickness) of a regular standard 0.85 mm PET monofilament was higher (worse) than a Hi-Life PET monofilament, which is the inventive abrasion resistant PET. See FIG. 11.

Figure 12:
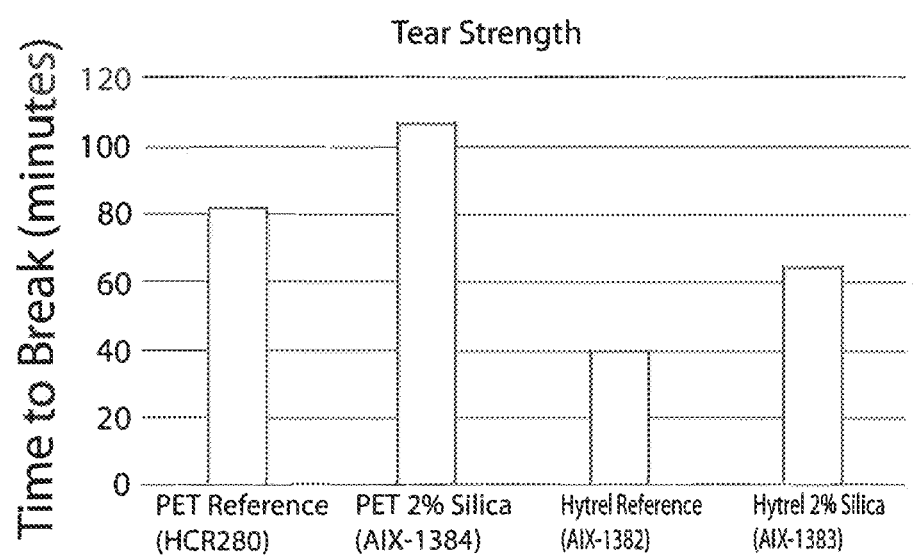
FIG. 12 is a chart showing the time (in minutes) required to break (tear) four different fabrics with the same weave, yarn sizes, mesh and yarn counts comprising monofilament yarns comprising: a PET reference material (HCR 280), PET with 2.0% silica A-glass beads (AIX-1384), a HYTREL® reference material (AIX-1382), and HYTREL® with 2.0% silica A-glass beads (AIX-1383). The monofilaments were all 0.50 mm round cross sections. HYTREL® is a COPE (copolyester elastomer).

It took more time to break PET fabrics made with yarns comprising 2.0% A-glass beads (AIX-1384) than a PET reference material (HCR 280), a HYTREL® reference material (AIX-1382), and HYTREL® with 2.0% A-glass beads (AIX-1383). Note however, the inventive HYTREL® material composition was better than the standard HYTREL® as well. See FIG. 12. The monofilaments were 0.50 mm round cross sections.

An image showing a fabric woven with alternating monofilament yarns (across the image) of composition S1618 0.50 mm S70 PET and 100% PA6 indicates abrasion resistance after 1 hour of external wear. See FIG. 13.

Figure 13:
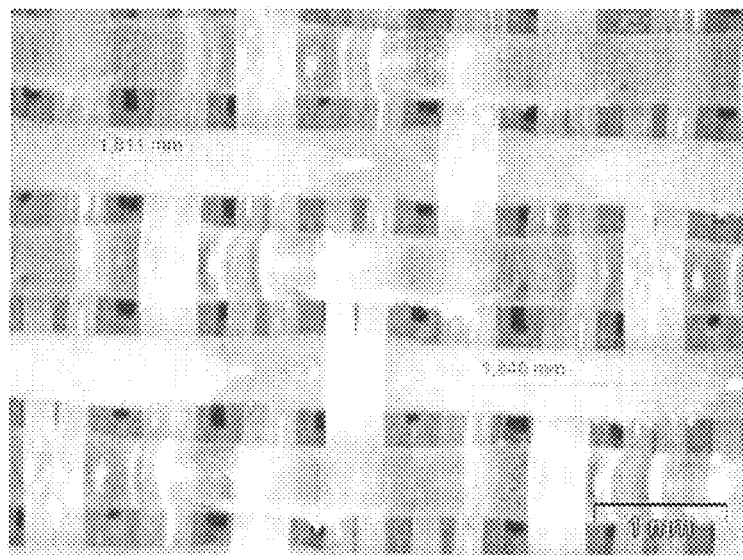
FIG. 13 is an image showing a fabric woven with alternating monofilament CD (cross direction) shute yarns (across the image) of composition S1618 0.50 mm S70 PET and 100% PA6 after 1 hour of external wear. The fabric shown is fabric with 0.50 mm PET shutes alternating with PA6 shutes. The "opaque" yarn is PET.
Figure 14:
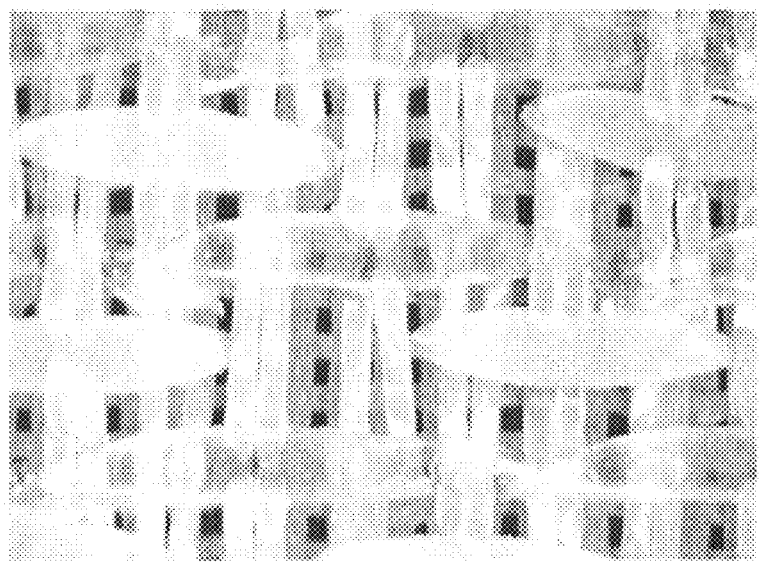
FIG. 14 is an image showing the wear of the fabric in FIG. 13, i.e., S1618 0.50 mm S70 PET and 100% PA6, after 2 hours of external wear.

An image showing the wear of the fabric in FIG. 13 indicates abrasion resistance after 2 hours of external wear. See FIG. 14.

An image showing a fabric woven like that of FIG. 13, but the S70 PET monofilament was replaced by one with a composition S1618 0.50 mm AIX-1390 (the inventive yarn composition with A-glass beads) indicates abrasion resistance after 1 hour of external wear. See FIG. 15.

Figure 15:
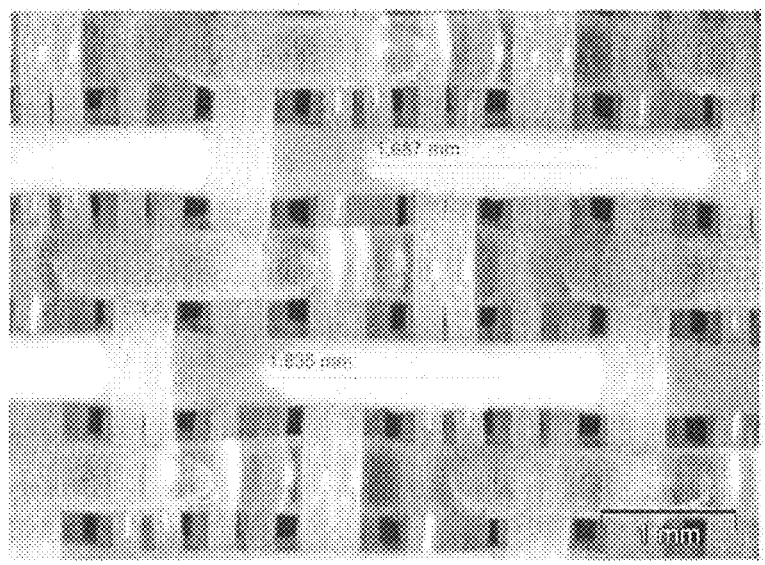
FIG. 15 is an image showing a fabric woven the same as that of FIG. 13, but the S70 PET monofilament was replaced by one with a composition S1618 0.50 mm AIX-1390 (the inventive yarn composition with A-glass beads) and PA6 after 1 hour of external wear. The PET shute (CD) yarn of FIG. 13 was replaced by the inventive yarn (same PET but with silica glass beads). Opaque yarn is PET with glass beads.
Figure 16:
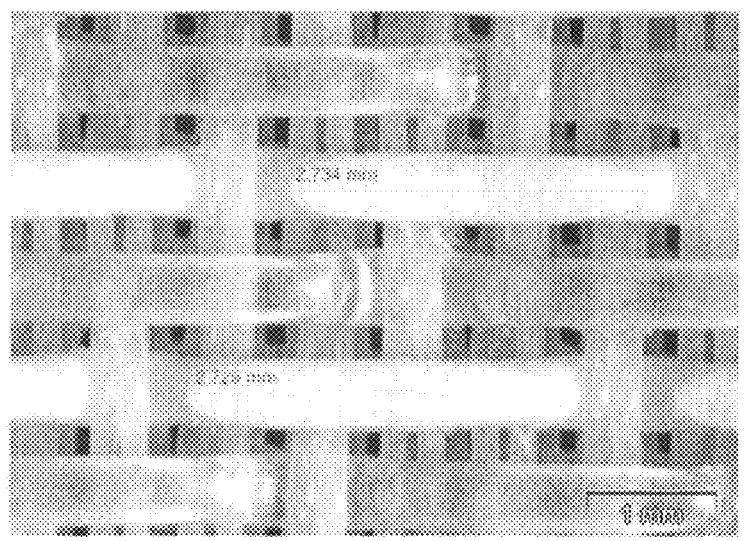
FIG. 16 is an image showing the fabric of FIG. 15, i.e., S1618 0.50 mm AIX-1390 (the inventive yarn composition with A-glass beads) and PA6, after 2 hours of external wear. The improvement in wear (abrasion) resistance is clearly visually apparent compared especially to FIG. 14.

An image showing the fabric of FIG. 15 indicates abrasion resistance after 2 hours of external wear. See FIG. 16.

Thus the main features of this material composition are:

1. Very good abrasion resistance. The actual fabrics tested comprising the inventive monofilaments demonstrated at least 20% improvement in abrasion resistance.

2. Minimal impact on the other physical properties of the resin component.

3. E-glass beads having a positive impact on the hydrolysis resistance of the resin component.

While specific embodiments of the disclosure have been discussed, the above specification is illustrative and not restrictive. One of ordinary skill in the art will appreciate that numerous changes and modifications can be made to the disclosure, and that such changes and modifications can be made without departing from the spirit and scope of the disclosure. The full scope of the disclosure should be determined by reference to the claims, along with their full scope of equivalents, and the specification, along with such variations.

Likewise, although technical features of the present invention might have been described only with respect to certain embodiments, the ordinarily skilled artisan will understand that features of some embodiments may be combined with features of other embodiments and that specific combinations of features described with respect to certain embodiments may also be combined with other features or other specific combinations of features described with respect to other embodiments.

Each patent, patent application, and publication cited or described in the present application is hereby incorporated by reference in its entirety as if each individual patent, patent application, or publication was specifically and individually indicated to be incorporated by reference.

What is claimed is:

1. A method of manufacturing a resin component composition comprising a polymer resin and silica glass beads, wherein said silica glass beads are added simultaneously to said polymer resin, which is then extruded or spun,
    wherein the silica glass beads are selected from A-glass and E-glass beads, and the silica glass beads are less than 10 microns and greater than or equal to 0.01 microns in average particle size diameter, and
    wherein at least about 1% and no more than 4% of said composition by weight comprises the silica glass beads.

2. A method of manufacturing a resin component composition according to claim 1, further comprising siloxane additive, wherein a siloxane additive and said silica glass beads are added simultaneously to said polymer resin, which is then extruded or spun.

3. A method of manufacturing the composition according to claim 1, comprising one or more polymers selected from the group consisting of: polyethylene naphthalate (PEN), polyethylene terephthalate (PET), polybutylene naphthalate (PBN), polytrimethylene naphthalate (PTN), poly(cyclohexylene dimethylene terephthalate) acid (PCTA), polybutylene terephthalate (PBT), polyamide (PA 6, PA 6,6, PA 6,12, PA 6,10, PA 4,6, PA 10, PA 11, PA 12; MXD6, and aromatic derivatives thereof), polyether ether ketone (PEEK), polyether ketone (PEK), poly(p-phenylene sulfide) (PPS/RYTON®), polyurethane, polysiloxane, and copolymers thereof.

4. A method of manufacturing the composition according to claim 3, comprising two or more polymers selected from the group consisting of: polyethylene naphthalate (PEN), polyethylene terephthalate (PET), polybutylene naphthalate (PBN), polytrimethylene naphthalate (PTN), poly(cyclohexylene dimethylene terephthalate) acid (PCTA), and polybutylene terephthalate (PBT).

5. A method of manufacturing the composition according to claim 3, comprising at least two polymer resins, wherein said silica glass beads are added simultaneously to said polymer resins, which are then extruded or spun.

6. A method of manufacturing a resin component composition according to claim 5, further comprising a siloxane additive, wherein the siloxane additive and said silica glass beads are added simultaneously to said polymer resins, which are then extruded or spun.

7. A method of manufacturing the composition according to claim 6, comprising two or more polymers selected from the group consisting of: polyethylene naphthalate (PEN), polyethylene terephthalate (PET), polybutylene naphthalate (PBN), polytrimethylene naphthalate (PTN), poly(cyclohexylene dimethylene terephthalate) acid (PCTA), polybutylene terephthalate (PBT), polyamide (PA 6, PA 6,6, PA 6,12, PA 6,10, PA 4,6, PA 10, PA 11, PA 12; MXD6, and aromatic derivatives thereof), polyether ether ketone (PEEK), polyether ketone (PEK), poly(p-phenylene sulfide) (PPS/RYTON®), polyurethane, polysiloxane, and copolymers thereof.

8. A method of manufacturing the composition according to claim 7, comprising two or more polymers selected from the group consisting of: polyethylene naphthalate (PEN), polyethylene terephthalate (PET), polybutylene naphthalate (PBN), polytrimethylene naphthalate (PTN), poly(cyclohexylene dimethylene terephthalate) acid (PCTA), and polybutylene terephthalate (PBT).

9. A method of manufacturing the composition according to claim 1, wherein said composition comprises one or more additives selected from the group consisting of: stabilizers, compatibilizers, hydrolysis or oxidation-resistant additives, dyes, and pigments.

10. A method of manufacturing the composition according to claim 1, wherein said composition is extruded or spun into a component selected from the group consisting of fiber, yarn, rings, films, foil, tape, mesh, spiral link coil and netting; or is a structured deposit or coating.

11. A method of manufacturing the composition according to claim 1, wherein about 4% to about 98% of said composition by weight comprises the polymer resin.

12. A method of manufacturing the composition according to claim 11, wherein about 0.5% to about 5% of said composition by weight comprises a siloxane additive.

13. A method of manufacturing the composition according to claim 12, wherein about 1% to about 5% of said composition by weight comprises the siloxane additive.

14. A method of manufacturing the composition according to claim 11, wherein the composition comprises the polymer resin in an amount of about 20% to about 98% of said composition by weight.

15. A method of manufacturing the composition according to claim 14, wherein: (a) 89% of said composition by weight is PET; (b) 6% of said composition by weight is PBT; (c) 2% of said composition by weight is a siloxane additive; (d) 1% of said composition by weight is carbodiimide; and (e) 2% of said composition by weight is the silica glass beads.

* * * * *